Sept. 29, 1936.    R. T. LANG    2,055,692
PAPER MAKING MACHINE
Filed Dec. 22, 1933    6 Sheets-Sheet 1

Richard T. Lang
by C. P. Goepel
Attorney

Sept. 29, 1936.  R. T. LANG  2,055,692
PAPER MAKING MACHINE
Filed Dec. 22, 1933   6 Sheets-Sheet 2

Richard T. Lang
by C. P. Goepel
attorney.

Sept. 29, 1936.  R. T. LANG  2,055,692
PAPER MAKING MACHINE
Filed Dec. 22, 1933  6 Sheets-Sheet 4

Richard T. Lang
by C. P. Goepel
attorney.

Patented Sept. 29, 1936

2,055,692

UNITED STATES PATENT OFFICE 2,055,692

PAPER MAKING MACHINE

Richard T. Lang, Heidenheim-on-the-Brenz, Wurttemberg, Germany, assignor to American Voith Contact Co., Inc., New York, N. Y., a corporation of New York Application December 22, 1933, Serial No. 703,532
In Germany December 24, 1932

26 Claims. (Cl. 92—45)

This invention relates to paper or similar machines, having a shaking device acting at any desired point, and has for its object to provide a complete and exact adjustment of a shake rail to the quality of the paper made, and has also for its object an improved sheet formation on the wire.

The present invention comprising a device which makes it easily possible to obtain a known increase in the shake intensity beginning, for instance, at the breast roll with the intensity being gradually augmented to the main zone of sheet formation and felting, which intensity is determined by the quality of the paper made at the time. According to the invention, the means for creating the shake movement are movably and adjustably arranged along a shake rail. The design can be so chosen that a device for producing the shake can be located beside the paper machine and be moved parallel to the latter, or that such a shake device is movably located on one of the rails and thus participates in the shaking movement of the rail, which in turn receives its shake from the shake device. According to the invention, the shake device can, independent of its drive, be used at any desired part of a Fourdrinier of a paper-making machine, for instance, at either the breast roll or the table roll section, as it can easily be adjusted to any occurring shake conditions. Several identical shake devices can simultaneously be used at various parts of the paper machine, the drive being either effected by a common shaft for all shake devices, or a separate drive for each one, also each shake device may have its own intensity of action independent of the others. According to the invention it is further possible to have several shake devices arranged to act at several places along the machine and subject the table roll section to a combination shaking action which, by changing the points of attack as well as the degree of intensity can be adjusted at will to best meet the sheet forming conditions. Means may here be provided to provide synchronous operation of the shake devices so that they continue to operate in a determined shaking cycle, as for instance, by arranging chain drives from a common drive shaft. Practical usage today does not wish to be confined to shaking the wire at one point only, but it is a desideratum to shake the wire at different points and with different degrees of intensity, corresponding to the sheet formation, when producing various grades.

The invention has also for its purpose to design the shake rails in such a yielding manner that an exactly determined movement action of the rails is obtained over the whole length of the Fourdrinier part. In this, it is possible in principle to start the movement at one or at various points, if desired. This is obtained by either having the rails elastically yieldable over their whole length or by dividing them into individually stiff sections which, however, are elastically yieldably interconnected. Means are provided in both instances to influence the degree of elasticity at various points in such a manner, that the desired shake motion is obtained. When the shake rail is in one piece, this variation is obtained by changing the stiffness of the rail at any desired point or points through a change of the moment of inertia, as for instance, by providing stiffening pieces or the like; where the shake rail is in sections, this object is reached by providing the interconnecting means with a suitable resistance to movement. In order to assume the uniformity of the wave-like or other undulating movement of each shake rail on each side of the machine, it is also possible to provide one or more cross-ties which are pivotally connected to one or both of the shake rails, or are themselves provided with a certain elasticity.

The invention also comprises a shake device having a mechanism in which the shaking movement is effected by means of rotary, eccentrically supported fly weights, said fly weights resting on disks rotating opposite to each other on a common axis. Its purpose is to obtain an effective high frequency shake which can be varied at will during the operation of the machine, in respect to its intensity, and whereby the components which are not in the desired direction of the shake, are entirely eliminated, so that thereby additional strains on the shake device and its supports are entirely eliminated.

The present invention also comprises a shake mechanism, the intensity of action of which can during its operation be effected by both a change in speed and by shake disks with eccentrically positioned fly weights, wherein said disks are adjustable at will in regards to their respective angular position. It is thereby possible to change over from the smallest shake produced by a respective adjustment of the fly weights on the two disks on the same axis, but of opposite rotation to any other desired shake. This may be done in a simple manner and during operation by means of a hand wheel which by means of gears then changes the respective angular position of the disks and the position of their fly weights. After the change, the desired position of the fly disks and the size of the shake remain unchanged.

Another characteristic of the invention is the equalization of the mass forces which change their respective position to each other and which are created by the shake components not located in the plane of movement of the parts to be shaken, inasmuch as the disks adjustable towards each other in their angular position cannot in a known manner be used for equalizing these forces. This equalization is brought about by arranging additional disks on the same or on an additional axis. These additional disks rotate in a direction opposite to the primary adjustable shake disks and these compensating disks always maintain at any desired adjustment position, a position of the fly weights which is opposite to the fly weight position of the respective shake disks with which they cooperate. The torque forces which tend to act adversely towards the shake mechanism and its yielding support are thereby compensated by an additional pair of loose disks which rotate in the same direction as the tight disks on the two shafts and also have the same angular position of their eccentrically located masses.

In the present invention, special importance is placed on the opposite rotation of the fly masses. In masses rotating in the same direction, the center of gravity of which can be changed at will during standstill of the machine by subdividing the masses and changing their angular position, large cross forces are created during operation, which are not in the desired shake plane. These cross forces which correspond to the projections of the centrifugal forces vertical to the direction of the shake, cause undesirable strains on the machine frame, etc. and must be eliminated as far as possible. This is accomplished by providing fly masses rotating oppositely to each other, which to a large degree compensate the cross forces acting vertically to the shake direction i. e., acting upon the supporting springs. The largest stroke is naturally obtained when the fly masses are arranged exactly opposite each other. If, however, the stroke is to be reduced in order to decrease the intensity of shake, the angular position of the fly masses must be changed. In a machine, as for instance a paper machine, which normally is operated for a period of a full week, an interruption of operation brings about great losses in production and profits, and it is, therefore, necessary that the shaking mechanism may be adjusted during operation. A second characteristic, connected with the opposite rotation, is the adjustability of the stroke during operation. Even if the cross forces are not as large as where the rotation is in the same direction, a far reaching force compensation in the direction of the frames and supporting springs effected by means of a second shaft with compensating disks, is of great value. Particularly where heavy masses are to be shaken, as for instance, in the Fourdrinier parts of a paper machine, substantial forces can be compensated for in this manner which otherwise would call for a much heavier construction of the respective parts.

Other features of the invention will be described and shown in connection with embodiments thereof, and the invention will be finally pointed out in the claims.

In the accompanying drawings,—

Similar characters of reference indicate various parts throughout the various views.

Referring to the drawings and more particularly to Figures 1 to 4, the table roll section comprises the well known breast roll 30, table rolls 31 and shake rails 32. In accordance with this invention, the shake rails are suspended from laminated springs 33, or they may be so supported or they may be connected with other parts of the section. The rail 32 on the drive side has a widened part 34 which, for example, may be provided with slots 35. A shaking device 36 provided with any suitable shaking means, but in accordance with this invention is provided with eccentrically located fly weights, as will be hereinafter described, and this shaking device is movably positioned on rail 34. Corresponding to the movability of the shaking device, a drive motor 37 is also arranged so as to be movable therewith. It can also, as for instance shown in Fig. 2, be directly and flangeably connected with the shaking device, and suitably supported by a support 38. The longitudinal movement of the shaking device 36 can be effected by hand, or, for instance, by means of spindle 39 and hand wheel 40.

Figure 4:
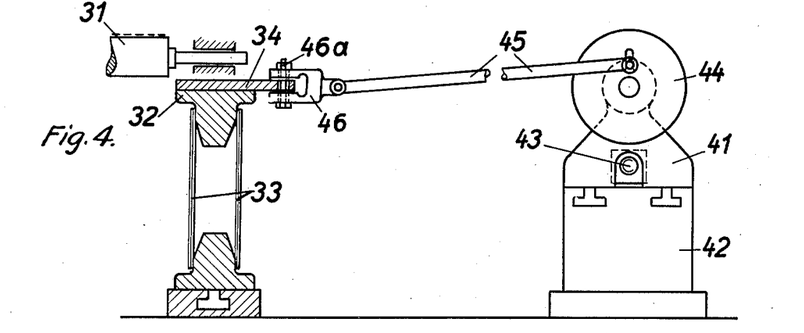
Figure 4 is a partial end view of a paper-making machine partially in section, with a different shake device.

In Figure 4, the shake device is placed laterally of the paper-making machine, and rests on a sliding piece 41 arranged movably along side the wire part, the sliding piece being moved on a standard 42 for instance by means of spindle 43. The connection between the shaking device 44 and the rail 34 is, for example, effected by means of rods 45 and slide pieces 46, which may be connected at any suitable place, by the detachable bolts 46ª there shown. The sizes of the weights connected to the suspended or supported rails and moving with them being unevenly distributed over the shaken part, the most suitable place for the application of the shake connected to the rail can easily be determined by moving the shaking device along the rail. The heavier parts, as for instance, the breast roll, being located at the beginning of the wire part, this end will naturally have less shaking movement than the lighter part towards the suction boxes. The invention thus provides a method for accomplishing a known shake increase towards that part of the wire which has the most effective influence on the felting of the sheet. The invention particularly permits the high shake frequency demanded by modern practice without any danger to the parts inducing the shake. By connecting the shaking device and its drive motor with the shake rail, a saving of space results.

Figure 1:
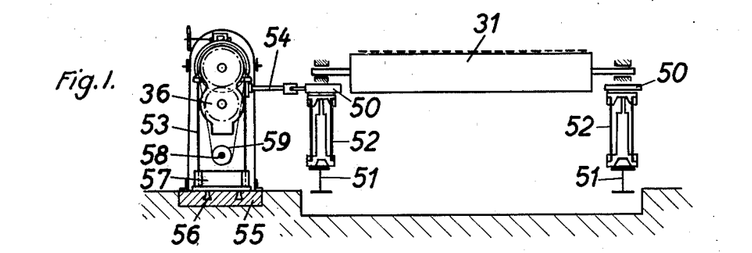
Figure 1 is an end view, partly in section, of part of a paper-making machine and a shake mechanism.
Figure 2:
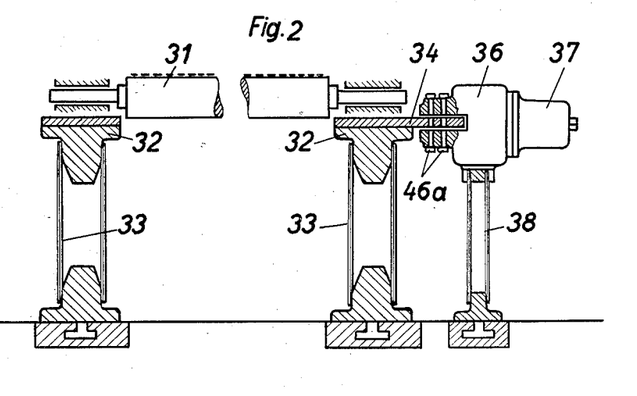
Figure 2 is a similar view, with a movable shaking device.
Figure 3:
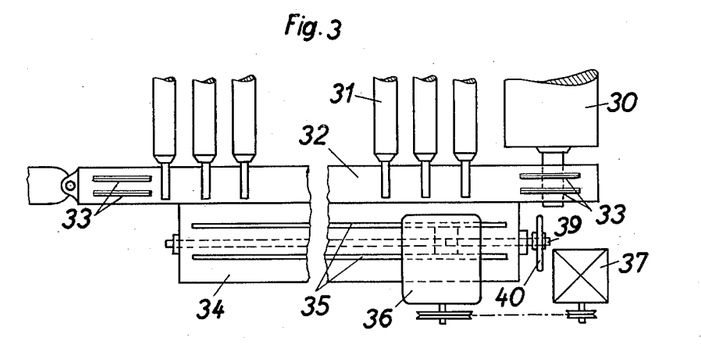
Figure 3 shows in plan view a shaking device movable along a shake rail.
Figure 5:
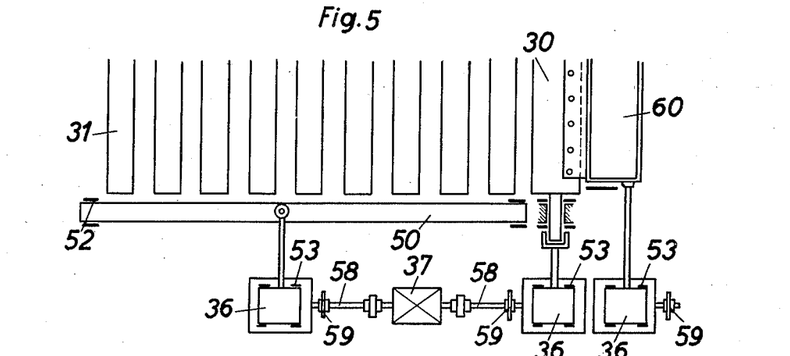
Figure 5 is a plan view of a group of shake devices with a common drive.
Figure 6:
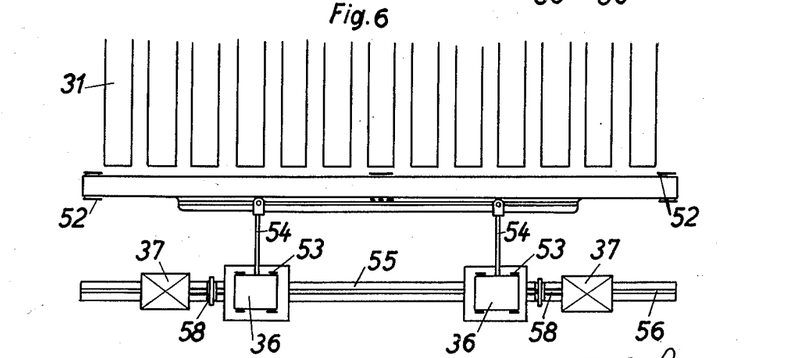
Figure 6 is a plan view of several shake devices movable along the shake rail.

Referring more particularly to Figures 1, 5, and 6, the table rolls 31 are supported on shake rails 50, which latter in turn are supported on beams 51 by means of laminated spring 52. The shake device 36 also rests on laminated springs 53 and transfers the shake movement by means of rods 54 to the shake rail 50. The shake device rests on foundation plates 55 provided with slots 56 in which it can be moved at will. A motor 37 is either positioned on a foundation frame 57 of the shake device or on foundation plates 55. The drive is effected from the shaft 58 by means of chains 59, and the shaft extends alongside the wire part and can be used for driving several shake devices. In Figure 5, for instance, there is shown a means for shaking the wire, breast roll 30 or stock box 60, and several shake devices 36, which may either be driven by individual motors, or by a common motor 37, over the shaft 58 and the chains 59 are also shown.

In Figure 6, the wire part is subjected to a combination shaking action produced by several shake devices. As each swing shake device can be individually adjusted for a different stroke, and where individual motors are provided, also for an individual shake frequency, it is possible to impart a more gentle shake to the wire near the breast roll and a more energetic one in the zone where the sheet is formed. Shake stroke and shake frequency can be coordinated at will according to the requirements of the sheet to be made. A like arrangement is, of course, possible between the shake device acting upon the wire part and those acting upon the breast roll and stock box respectively. The point of attack of the shake rail is changed by moving the shake devices on rail 55 along the wire, the shake rods 54 being fastened to another point of the shake rail 50. Where individual motor drives are used, the change can be effected in a particularly simple manner. When the several shake devices are driven from one common shaft, the chain wheels are moved on the shaft. A chain drive is preferable for a synchronous action inasmuch as V- or other leather belts may, due to slippage, give another cycle, resulting from the various shake devices, than such as would correspond to the position of the fly pulleys.

By means of the invention new and advantageous effects are produced on wire parts of paper machine. It is possible to locate the shake devices close to the wire, and much space can be saved as compared with the present known arrangements and the building wall can be moved much closer. By placing the shake device on laminated springs and compensating the forces acting upon the shake frame supports, their foundations can be kept much lighter and a reinforcing of the foundations is not necessary to such a large extent. The possibility of varying during the operation of the machine the soft and shock-free shake and adjusting it exactly to every machine speed and stock consistency, gives to the machine operator an entirely new, simple and progressive means for producing a high grade sheet of paper.

Figure 7:
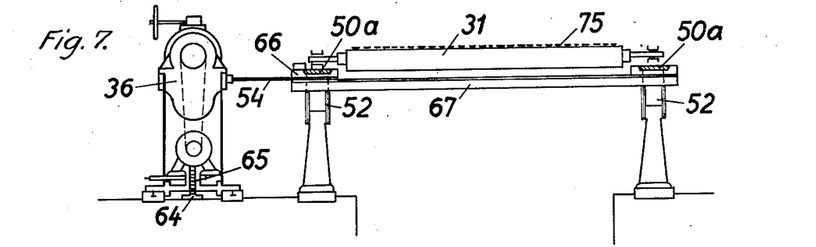
Figure 7 is a view similar to Fig. 1, showing both shake rails connected together.
Figure 8:
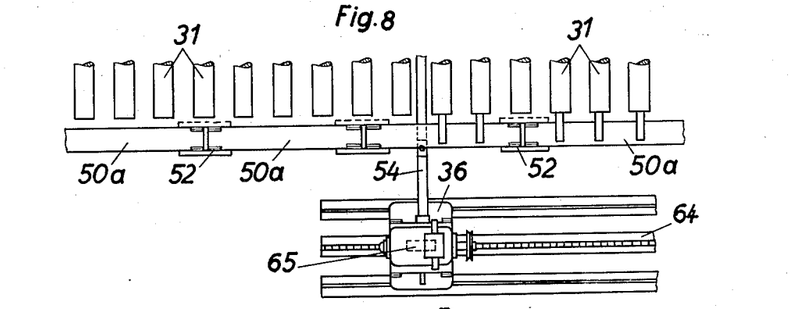
Figure 8 is a part plan view of the embodiment shown in Figure 7.
Figure 9:
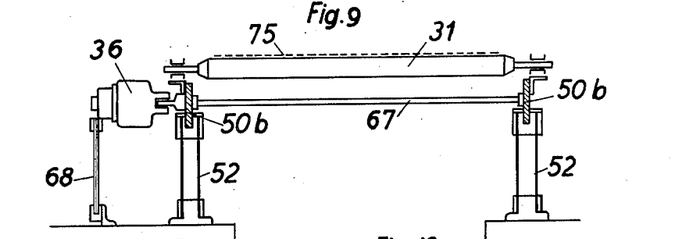
Figure 9 is a view similar to Fig. 7 but with vertical shake rails, also preferably joined together.

Referring to Figures 7 to 9, the table rolls 31 are located on sectionally divided shake rails 50ª, which in turn are supported by laminated springs 52. The various rail section ends are interconnected by means of links 62, (see Figure 14), or laminated springs 63 (see Figure 10), or both, (see Figure 15), the connecting parts being attached singly or in pairs to the rail section ends. The shake device 36 is movable along the wire. It may, for instance, be positioned upon the shake rail itself or located adjacent to it as hereinbefore described. According to Figures 7 and 8, for instance, a yieldingly supported fly disk shake device 36 with an adjustable stroke, is movable along the wire part by means of tooth rack 64 and pinion 65. The shake rod 54 acts at any desired point of the various rail sections, the connection between them and rod 54 being effected for instance, by a clamp 66 in Figure 7. By means of an elongated rod 67 in Figure 9, the shake rod may also act on both shake rails, that is, on the tender's side, as well as on the driver side.

Figure 9 shows another example of the invention. Vertically positioned rails 50ᵇ serve as a support for the wire table which, due to the low moment of resistance of the rail with respect to the vertical axis is elastically yieldable for the shake movement. For the maintenance of equal movement of the rails on both the tender's and the drive side, cross ties 67 are provided which, being either pivotally connected with the rails or elastic in themselves, transfer the wave movement without obstructing it. A shake device 36 may, for instance, be fastened to the rail 50ᵇ itself, and be supported by the latter, the spring 68 also serving as support in this instance.

Figures 10, 11, 12:
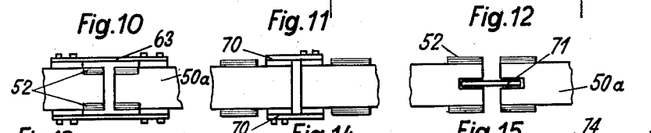
Figures 10 to 15 are views of various forms of elastic interconnections of the individual parts of the rails.
Figure 13:
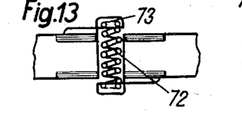
Figure 14:
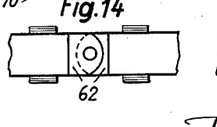
Figure 15:
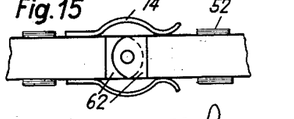
Figure 16:
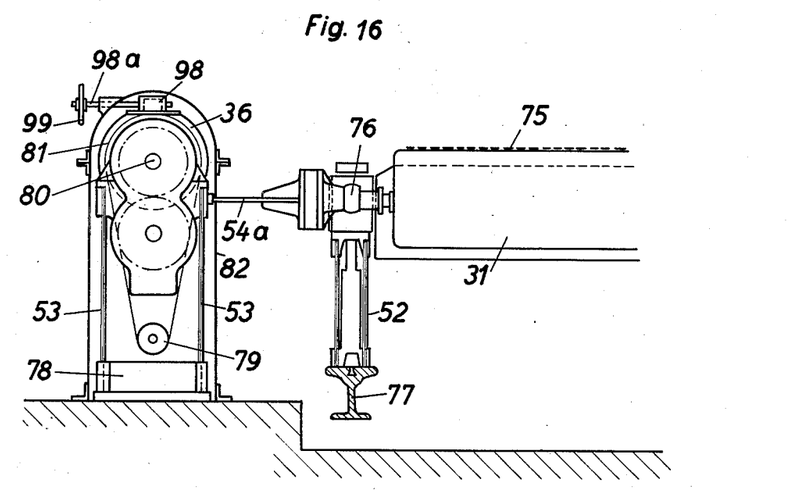
Figure 16 is a view showing a shake device cooperatively arranged with a paper-making machine.
Figure 17:
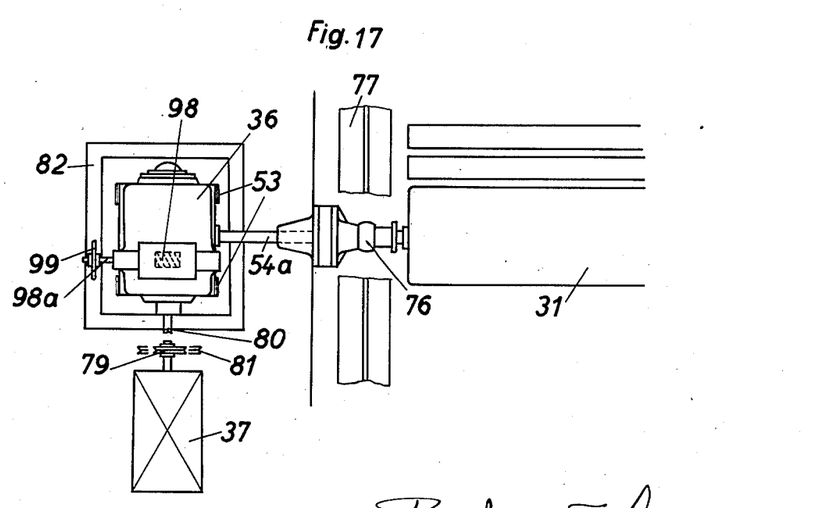
Figure 17 is a plan view of Fig. 16.

Several means for connecting horizontally positioned rails are shown in Figures 10 to 15. Laminated springs 63 can, for instance, as shown in Figure 10 be fastened in pairs on both sides of the rail section ends with a given distance from the latter. As shown in Figure 11, it is also possible to provide on each of two adjacent section ends, one spring 70, the spring end freely surrounding the adjacent rail. The rail section ends having their axes inclined towards each other in the wave movement, operate freely. Figure 12 shows another elastic connection, the spring 71 being inserted in the rail section ends. It is also possible to provide a wire spring 72 crosswise to the run of the wire, one spring end being attached to one rail section end and the other spring end to the second rail section end by means of holders 73, as shown in Figure 13. It would also be possible to provide rubber shackles between the holders 73, or to interconnect the rail ends by means of rubber aprons. Figure 14 shows an elastic rail connection, the rail ends being provided with link heads 62. Figure 15 shows another elastically yielding rail connection, a link connection being made elastically yielding by means of laminated bridge 74. In this manner the shake is, as in the other rail connections, transmitted in a wave-like form to the adjacent rail sections, causing them to participate in the swinging movement, and thereby bring about a gradual decrease of the movement corresponding to the progressive sheet formation. The selection of the springs determines the course of movement along the wire part. In the case of one-piece shake rails, the degree of elasticity can be influenced by changing the moment of inertia, by attaching stiffening pieces to the rails at desired points.

Referring to Figures 16 to 21, the roll 31 with a wire 75, and the support 76 of the roll 31, are yieldingly supported on rails 77 by means of laminated springs 52. The bearing support is connected by means of rods 54 with the shake device 36, which also rests on supporting springs 53 and is supported on the base frame 78. The shake shaft 80 is driven, for instance, by means of a pulley 79 by the motor 37 and its drive pulley 81. All these parts are surrounded by a protecting covering 82, which also can include the motor so that the whole shaking mechanism is comprised within housing 82.

Figure 18:
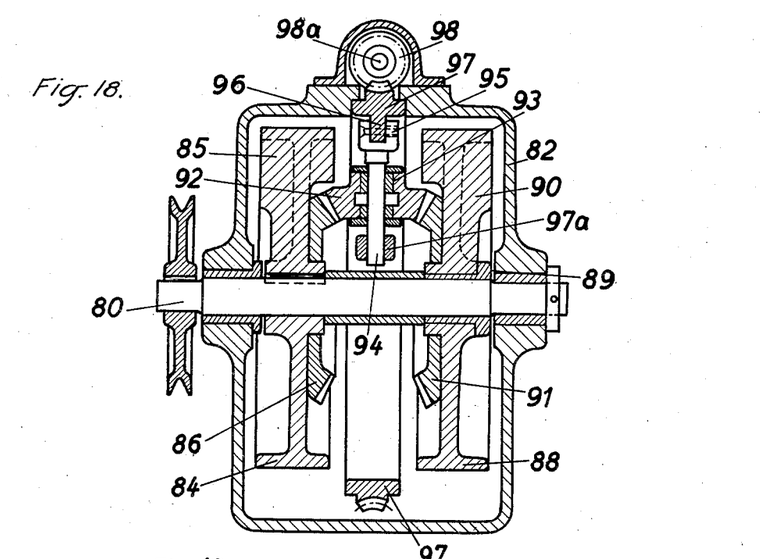
Figure 18 is a vertical center section through a simple shake device.
Figure 19:
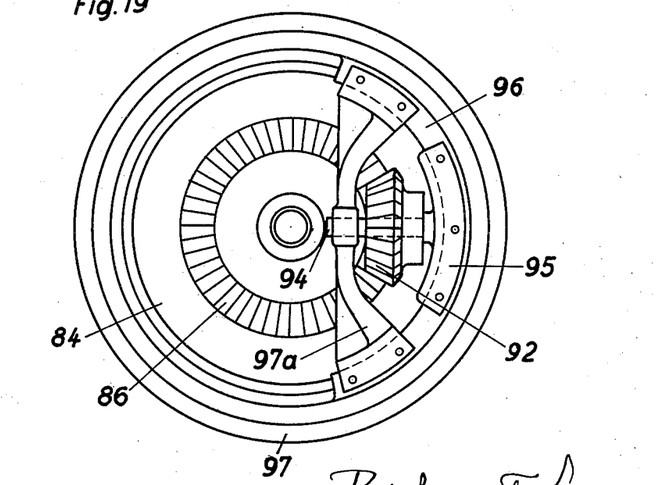
Figure 19 is a vertical cross housing section with inner view of the drive parts, of Fig. 18.

As Figure 18 shows, a pulley 84 is keyed to shaft 80, the pulley carrying an eccentrically positioned weight 85 and a bevel gear 86. Another pulley 88 loosely supported on a bushing 89 or in roller bearings also carries an eccentrically positioned fly weight 90 and a bevel gear 91. The drive of the oppositely rotating pulleys 84 and 88, is effected through a pinion 92, which meshes with both bevel gears 86 and 91 of the pulleys. The pinion 92 has a bushing 93 and rotates around a shaft 94, which by means of a bridge 95 is connected to the flange 96 of the worm gear 97. The other end of shaft 94 is held by a bridge holder 97ª which also is connected to a flange 96.

The worm wheel 97 is rotated by means of a worm wheel 98 in a housing 82, and in this manner the position of the pinion towards the tight pulley 84 is changed. When turning the worm gear 97 and the pinion 92, by means of the worm 98 and the hand wheel 99, the loose pulley 88 is also turned which causes any desired change in the angular position of the fly weights 85 and 90. After this change of the fly weight adjustment, which can be carried out during the operation of the machine, the pinion is held fast by the worm drive. Spindle 98ª of worm 98 extends freely through protective housing 82, so that the hand wheel 99 can be actuated from the outside.

Figure 20:
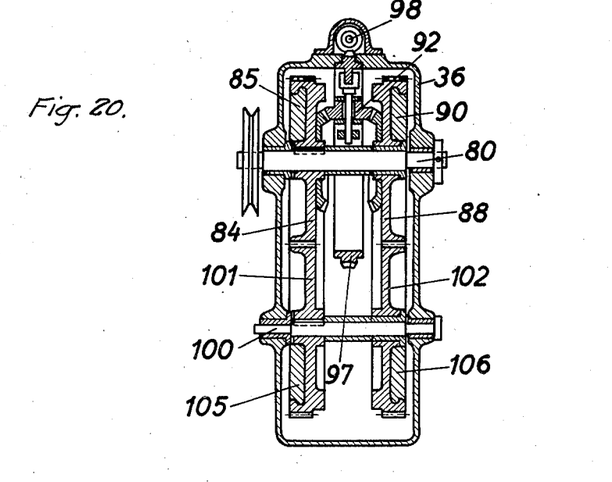
Figure 20 is a vertical center section through a shake device with compensator shaft.

The shake mechanism 36 in Figure 20 shows in its upper part the same arrangement as is shown in Figure 18. For compensating the shaking components acting upon the supporting springs 53 and the foundation plate 78, the invention also provides below the shaft 80, a further stationary or rotating shaft 100 with a tight pulley 101 and a loose pulley 102, both of them having toothed rims and being in mesh with pulleys 84 and 88, having the same diameter as the latter and rotating in the opposite direction from them. The fly weights 105 and 106 are so attached to the compensating pulleys that they are exactly like the fly weights of the upper pulleys and are positioned exactly opposite to them. By means of this arrangement only the shake forces acting in the direction of the roll axis become effective. The same effect can be obtained by arranging these compensating pulleys 101 and 102 on the same axis as the shake regulating pulleys proper 84 and 88. However, not only the first adjustable pulley pair must rotate in respective opposite directions, but the second pulley pair must carry out the same requirement.

Figure 21:
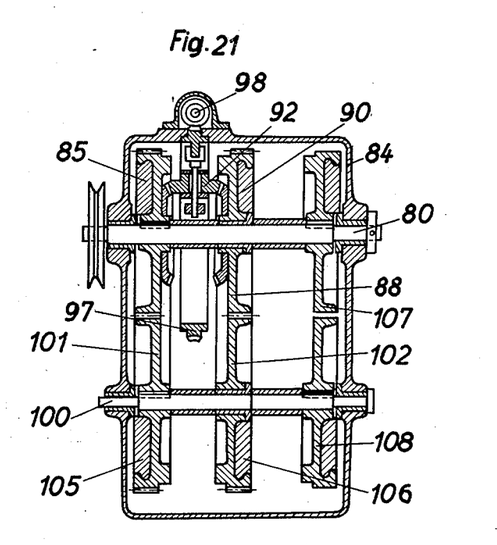
Figure 21 is a vertical center section through a multiple shake device.

If it is further desired to compensate the torque forces acting upon the shake mechanism and upon its supporting springs, it is possible, as shown in Figure 21, to place on each shaft besides the loose pulleys 88 and 102, also a tight pulley 107 and 108 respectively, the distance from its respective loose pulley being alike for both these tight pulleys. These additional pulleys have the same fly weights in the same position as the other tight pulleys, but they need not mesh with each other.

Contrary to the known complicated shaking devices, the simple design according to the invention has the advantage of giving a soft shake free from shocks so that a wearing off of the shaking parts is almost entirely eliminated. Aside from the main advantage of the invention, that is adjustment of the stroke during operation, it also incorporates the possibility, in order to protect the swinging parts from quick wear, of starting their movement with the smallest strokes and gradually increasing the shake to a large stroke. Up to now, it was not possible to accomplish this with swinging shakes inasmuch as the stroke could only be adjusted when the machine was standing still. By means of the invention, it is now possible without danger to the shake-inducing and the shaken parts to obtain a soft, high frequency shake, the intensity of which can during operation of the machine be adjusted at will. This fact is of particular importance for screens and wires of all kinds where the material to be screened changes often and where it is inconvenient to stop the machine for changing the shake. With the present invention, it is possible without difficulty to change from one operating method over to another one and to adjust the shake so as to best meet the requirement of the stock to be handled. The invention makes it further possible to attach the simple and self-contained swing shake device to which the drive motor can be easily connected and the device as easily connected with one of the parts to be shaken. If desired, the shake device can be moved back and forth on a rail, and it can act upon any desired part of the paper-making machinery which is to be shaken. The space requirements for the shake device are considerably smaller than for known shaking devices. It exerts no forces whatever on its supports or foundations so that its operation is absolutely safe.

Several embodiments have been shown and described but changes can be made therein without departing from the spirit of the invention as set forth in the accompanying claims.

I claim:

1. In a Fourdrinier paper and similar machine, a table roll section, a shake rail for the same, a shake device acting at any suitable part of the table roll section, and means operating the shake device, said shake device being movably arranged alongside the shake rails.

2. In a Fourdrinier paper and similar machine, a shake device, a support for the same, means for moving the shake device, a shake rail and a shake rod moved by said moving means for shaking the shake rail.

3. In a Fourdrinier paper and similar machine, a shake device for creating a shake, and a shake rail, movably connected with the shake device, and means supporting the shake device for movement alongside said shake rail.

4. In a Fourdrinier paper and similar machine, a shake rail, a shake device movable along said shake rail, means for yieldingly supporting the shake rail, and means for moving the shake device, and means for yieldingly supporting the shake device.

5. In a Fourdrinier paper and similar machine, a shake rail, a shake device movable along said shake rail, means for yieldingly supporting the shake rail, and means for moving the shake device, said means including a spindle and hand wheel, and slots in the shake rail.

6. In a Fourdrinier paper and similar machine, a self contained shake device, a shake rail, means connecting the shake device and shake rail whereby to operate the latter from the former, springs for supporting the shake device independent of the shake rail, said shake device being supported for movement longitudinally of the shake rail, and means for moving the shake device.

7. In a Fourdrinier paper and similar machine, a shake rail, a shake device, and means disengageably connecting the shake rail and said shake devices in such a manner that the shaking motion can actuate the shake rail at any desired place.

8. In a Fourdrinier paper and similar machine, a shake rail, comprising a plurality of separately constructed sections, and elastically yieldable means interconnecting said sections.

9. In a Fourdrinier paper and similar machine, a shake rail, means subdividing the shake rail into several sections, and means interconnecting the subdivided parts of the shake rail elastically yieldingly, said last named means including laminated springs attached to the rail section ends.

10. In a Fourdrinier paper and similar machine, a plurality of rail sections, and means connecting the ends of the rail sections, said means including inherently yieldable members, and means varying the degree of stiffness of said members for various shake forms as for instance by exchange or adjustment.

11. In a Fourdrinier paper and similar machine, a plurality of rail sections, and yielding means adjusting the resistance moment of the shake rails more in a horizontal axis than in a vertical axis.

12. In a Fourdrinier paper and similar machine, shake rails, cross ties for the same, comprising inherently yieldable members connecting the rail section ends for varying the stiffness of the shake rails to transfer the shake or wave-like movement between the tender's and driver sides, the yieldability of the Fourdrinier parts being thereby maintained.

13. In a Fourdrinier paper and similar machine, a shake rail for yieldingly supported or suspended machinery parts, as for instance screens or parts carrying them, and a shake device comprising rotating pulleys coaxially arranged on a common shaft, eccentrically positioned fly weights on said pulleys, means for changing the intensity of the shake of the shake device during the operation of the shake device, not only by changing the number of revolutions, but also by changing the angular position of the fly weights with regard to each other, and a gearing arrangement between and connecting the pulleys for rotating them in opposite directions, said gearing being between the side faces of the pulleys.

14. The combination, in a Fourdrinier paper and similar machine, which includes a shake device, of a shake mechanism therefor comprising tight pulleys, fly weights on the pulleys, loose pulleys, and a bevel gear arrangement between the pulleys and giving them a rotary movement in opposite directions.

15. In a Fourdrinier paper and similar machine, a shake device having a shake mechanism comprising a tight pulley, a loose pulley, a fly weight on each pulley, bevel gears connecting the pulleys, for giving them rotation in opposite directions to change the relative position of the fly weights, and means changing the position of the gears in respect to the pulleys during the operation of the shake device at will with respect to the circumference of the pulleys.

16. In a Fourdrinier paper and similar machine, a shake device having a mechanism comprising a tight pulley, a loose pulley, a fly weight on each pulley, a bevel gear on each pulley, for changing the relative position of the fly weights, means changing the position of at least one gear during the operation of the shake device at will with respect to the circumference of the tight pulley, a pinion between and meshing with said gears, a rotatable regulating ring for moving the pinion, a drive housing, and means for moving the ring in the drive housing.

17. In a Fourdrinier paper and similar machine, a shake device having a shake mechanism comprising a tight pulley, a loose pulley, a fly weight on each pulley, a bevel gear on each pulley, for changing the relative position of the fly weights, means changing the position of at least one gear during the operation of the shake device at will with respect to the circumference of the pulleys, a pinion between and meshing with said gears, a rotatable regulating ring for moving the pinion, a drive housing, means for moving the ring in the drive housing, a shaft for the pinion on one side thereof, a flange, a bridge supported on the flange, and a cross bar regulating ring on the other side supported on a cross bar, and connected with the regulating ring.

18. In a Fourdrinier paper and similar machine, a shake device having a shake mechanism comprising a tight pulley, a loose pulley, fly weights on the pulleys, a gear on the loose pulleys, for changing the relative position of the fly weights of the light and loose pulleys, means changing the position of the gear during the operation of the shake device at will, a pinion, a rotatable regulating ring for moving the pinion, a drive housing, means for moving the ring in the drive housing, a shaft for the pinion on one side thereof, a flange, a bridge supported on the flange, a cross bar regulating ring on the other side supported on a cross bar and connected with the regulating ring, a regulating ring designed as a spur gear or worm gear, and a worm for rotating the same.

19. In a Fourdrinier paper and similar machine, a shake device having a shake mechanism, means for changing the shaking forces at will, and means compensating the components which are not located in the direction of the parts to be moved, comprising additional fly-weight pulleys, said additional fly-weight pulleys having an opposite direction of rotation with respect to each other and with respect to their corresponding first named pulleys.

20. In a Fourdrinier paper and similar machine, a shake device having a shake mechanism, means for changing the shaking forces at will, and means compensating the components which are not located in the direction of the parts to be moved, comprising additional fly-weight pulleys, said additional fly-weight pulleys having an opposite direction of rotation with respect to each other and with respect to their corresponding first named pulleys, a further shaft with two fly weight pulleys, which pulleys have an opposite fly weight adjustment as compared with the first named pulleys.

21. In a Fourdrinier paper and similar machine, a shake device having a shake mechanism, comprising means for changing the shaking forces at will and means compensating the components which are not located in the direction of the parts to be moved fly weight pulleys, additional fly-weight pulleys, said additional fly-weight pulleys having an opposite direction of rotation with respect to each other and with respect to their corresponding pulleys, a further shaft with two fly-weight pulleys, which pulleys have an opposite fly-weight adjustment as compared with the shake pulleys, and additional pulleys in tooth mesh with their respective shake pulleys, the pitch diameter being the same for both pulley sets.

22. In a Fourdrinier paper and similar machine, a shake device having a shake mechanism, including means for providing a torque effect on the shake housing, and an elastic support, which torque effect is caused through the movement of the fly-weight masses adjusted to any desired angle and which is changed in its intensity, during operation, and means for compensating the same by providing a third additional pair of pulleys, which pulleys have eccentrically positioned fly-weight masses.

23. In a Fourdrinier paper and similar machine, a shake device on an elastic support having a shake mechanism, including means comprising pulleys for providing a torque effect on the shake housing, which torque effect is caused through the movement of the fly-weight masses adjusted to any desired angle and which is changed in its intensity, during operation, means for compensating the same by providing a second pair of pulleys, which pulleys have eccentrically positioned fly-weight masses, additional pulleys having substantially the same distance from second pulleys as the second pulleys are spaced on the shaft from the first pulleys, the radial position of the fly-weight masses on each two of the pulleys being the same.

24. In a Fourdrinier paper and similar machine, Fourdrinier parts as stock box, breast roll, and table roll sections, independently yieldable means supporting said parts, shake frames connected with said parts for imparting shaking movement thereto, yielding means supporting said shake frames and permitting a shaking of the shake frames in the same direction as the shaking of the table roll sections, and individually effective shake devices for operating the shake frames to vary the intensity of the shaking operation.

25. In a Fourdrinier paper and similar machine, Fourdrinier parts as stock box, breast roll, and individual rolls, independently yieldable means supporting said parts, shake frames connected with said parts for imparting shaking movement thereto, yielding means supporting said shake frames and permitting a shaking of the shake frames in the same direction as the shaking of the individual rolls, and individually effective shake devices for operating the shake frames to vary the intensity of the shaking operation.

26. In a Fourdrinier paper and similar machine, a shake rail composed of a plurality of elastically connected members, said shake rail having elastically yieldable movement over its entire length, and means for causing exactly predetermined wave-like or otherwise phase-different movement in a vertical plane over the entire length of the shake rail, said means being effective to vary the intensity of such movement.

RICHARD T. LANG.